United States Patent
Considine et al.

(10) Patent No.: US 10,233,972 B1
(45) Date of Patent: Mar. 19, 2019

(54) BEARING RACE WITH SERRATIONS

(71) Applicant: GM GLOBAL TECHNOLOGY OPERATIONS LLC, Detroit, MI (US)

(72) Inventors: Julia Considine, Brighton, MI (US); John H. Rode, Swartz Creek, MI (US); Eric R. Doak, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/699,140

(22) Filed: Sep. 8, 2017

(51) Int. Cl.
*F16C 33/58* (2006.01)
*F16C 35/04* (2006.01)

(52) U.S. Cl.
CPC ......... *F16C 33/583* (2013.01); *F16C 35/042* (2013.01); *F16C 2204/60* (2013.01); *F16C 2326/06* (2013.01)

(58) Field of Classification Search
CPC .. F16C 33/583; F16C 35/042; F16C 2204/60; F16C 2326/06; F16C 2226/52; F16C 2226/80
See application file for complete search history.

(56) References Cited

U.S. PATENT DOCUMENTS

| | | | | |
|---|---|---|---|---|
| 3,405,982 A * | 10/1968 | Krenn | ..................... | F16C 33/08 384/537 |
| 4,213,660 A * | 7/1980 | Yasui | ..................... | F16C 19/364 29/525 |
| 4,512,679 A * | 4/1985 | Petrzelka | .............. | F16C 21/005 403/57 |
| 5,058,262 A * | 10/1991 | Brockmuller | .......... | B21K 25/00 29/725 |
| 5,362,171 A * | 11/1994 | Ritschel | ................. | D04B 27/08 403/151 |
| 5,829,135 A * | 11/1998 | Koneda | ................... | F16D 1/072 29/892.11 |
| 9,393,836 B2 * | 7/2016 | Mochinaga | ........... | F16C 33/586 |
| 9,435,380 B2 * | 9/2016 | Suzuki | .................. | F16C 35/063 |
| 9,816,561 B2 * | 11/2017 | Hodge | ................ | F16C 35/0635 |
| 9,829,048 B2 * | 11/2017 | Mochinaga | ............. | F16D 1/072 |
| 2003/0108262 A1 * | 6/2003 | Bell | ...................... | F16C 19/364 384/585 |
| 2003/0210841 A1 * | 11/2003 | Linden | ................. | F16C 35/067 384/537 |

* cited by examiner

*Primary Examiner* — Thomas R Hannon
(74) *Attorney, Agent, or Firm* — Cantor Colburn LLP

(57) ABSTRACT

A race of a bearing assembly is provided. The race includes an exterior facing surface having front and rear faces and serrations extending in an axial direction between the front and rear faces and protruding outwardly from the exterior facing surface.

15 Claims, 5 Drawing Sheets

BEARING RACE WITH SERRATIONS

INTRODUCTION

The subject disclosure relates to a bearing assembly. More particularly, the subject disclosure relates to a bearing race which is prevented from rotating within a housing or relative to a rotating element supported within the housing.

In most vehicles, drive power is transferred from a portion of the vehicle where the engine is housed to other portions of the vehicle. For example, where the engine is housed in a front of the vehicle, drive power may be transferred from the front of the vehicle to an axle at the rear of the vehicle. This is generally accomplished by way of a transmission coupled to a drive shaft that runs from the front of the vehicle to the rear. The drive shaft is secured relative to the vehicle chassis by bearing assemblies that support its weight and permit free rotation of the shaft about a longitudinal axis thereof.

The bearing assemblies are normally seated within a housing defined by the chassis or by another feature which is fixed relative to the chassis. In any case, an incident in which one or more of the bearing assemblies spin relative to the housing can affect bearing and gear life in various systems associated with the drive shaft.

SUMMARY

In one exemplary embodiment, a race of a bearing assembly is provided. The race includes an exterior facing surface having front and rear faces and serrations extending in an axial direction between the front and rear faces and protruding outwardly from the exterior facing surface.

In addition to one or more of the features described herein, at least the serrations include steel.

In addition to one or more of the features described herein, the serrations protrude radially outwardly from the exterior facing surface.

In addition to one or more of the features described herein, lands which are coplanar with the exterior facing surface are defined between neighboring serrations.

In additional to one or more of the features described herein, lands which are radially displaced from the exterior facing surface are defined between neighboring serrations.

In addition to one or more of the features described herein, each serration abuts in a side-to-side arrangement with at least one neighboring serration.

In addition to one or more of the features described herein, each serration is spaced from at least one neighboring serration.

In addition to one or more of the features described herein, each serration includes opposite axial ends and lateral surfaces which extend between the opposite axial ends and taper toward one another with increasing radial distance from the exterior facing surface.

In addition to one or more of the features described herein, at least one of the opposite axial ends includes a taper.

In another exemplary embodiment, an anti-rotation bearing assembly mounting is provided and includes a housing defining an aperture, a rotating feature extending through the aperture and a bearing assembly. The bearing assembly is disposed to support the rotating feature in the aperture during rotation thereof and includes outer and inner races which interface with the housing and the rotating feature, respectively. At least an exterior facing surface of the outer race includes serrations configured to deform a material of the housing during an insertion into the aperture of the housing.

In addition to one or more of the features described herein, the housing includes a chassis of a vehicle and the rotating feature includes a rotatable shaft.

In addition to one or more of the features described herein, a rotating element is secured between the outer and inner races.

In addition to one or more of the features described herein, the outer race includes a material which is harder than that of the housing.

In addition to one or more of the features described herein, each serration abuts in a side-to-side arrangement with at least one neighboring serration.

In additional to one or more of the features described herein, each serration is separate from at least one neighboring serration.

In addition to one or more of the features described herein, each serration includes opposite axial ends and lateral surfaces which extend between the opposite axial ends and taper toward one another.

In addition to one or more of the features described herein, the opposite axial ends taper towards one another.

In addition to one or more of the features described herein, at least one of the opposite axial ends includes a taper.

In yet another exemplary embodiment, a bearing insertion method is provided and includes forming a bearing assembly race with an exterior facing surface, providing the exterior facing surface with serrations extending in an axial direction and protruding radially outwardly from the exterior facing surface and inserting the bearing assembly race into an aperture of a housing such that the serrations deform the housing during the insertion.

In addition to one or more of the features described herein, at least the serrations include a harder material than that of the housing.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
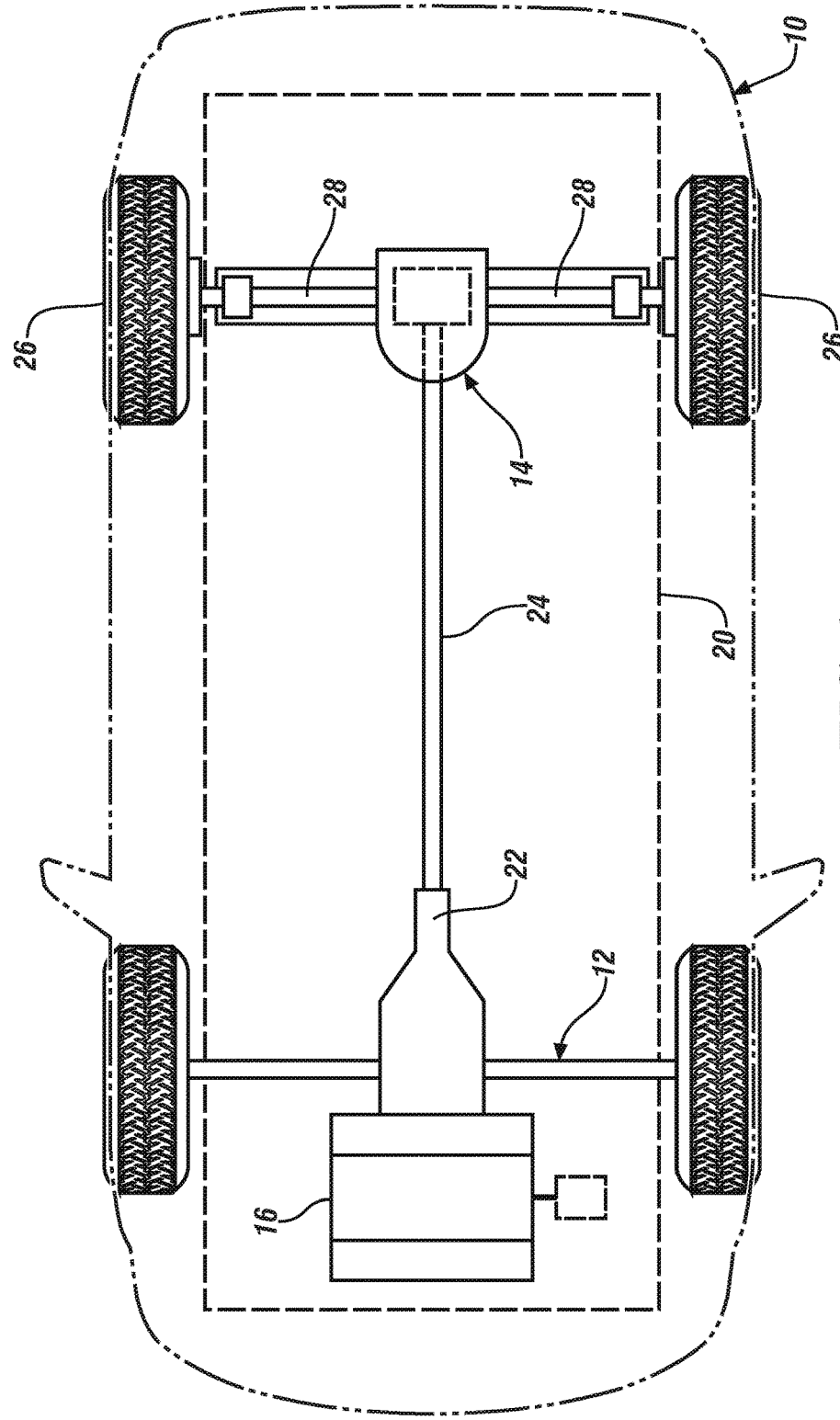
FIG. 1 is a plan view of an underside of a vehicle in accordance with embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates a vehicle 10 having a front axle assembly 12 and a rear-drive module ("RDM") 14. It should be appreciated that the vehicle 10 may be an automobile or a truck, for example. The vehicle 10 includes an engine (or other prime mover) 16, such as a gasoline or diesel fueled internal combustion engine ("ICE") or a hybrid-type engine that combines an internal combustion engine with an electric motor for example.

The engine 16 and the RDM 14 are coupled to a vehicle structure such as a chassis or frame 20. The engine 16 is coupled to the RDM 14 by a transmission 22 and a rotatable prop-shaft 24. In an embodiment, the transmission 22 is configured to reduce the rotational velocity and increase the output torque of the engine 16. The modified output torque is transmitted to the RDM 14 via the rotatable prop-shaft 24. The RDM 14 transmits the output torque from the prop-shaft 24 to a pair of driven wheels 26 via rear axles 28.

Figure 2:
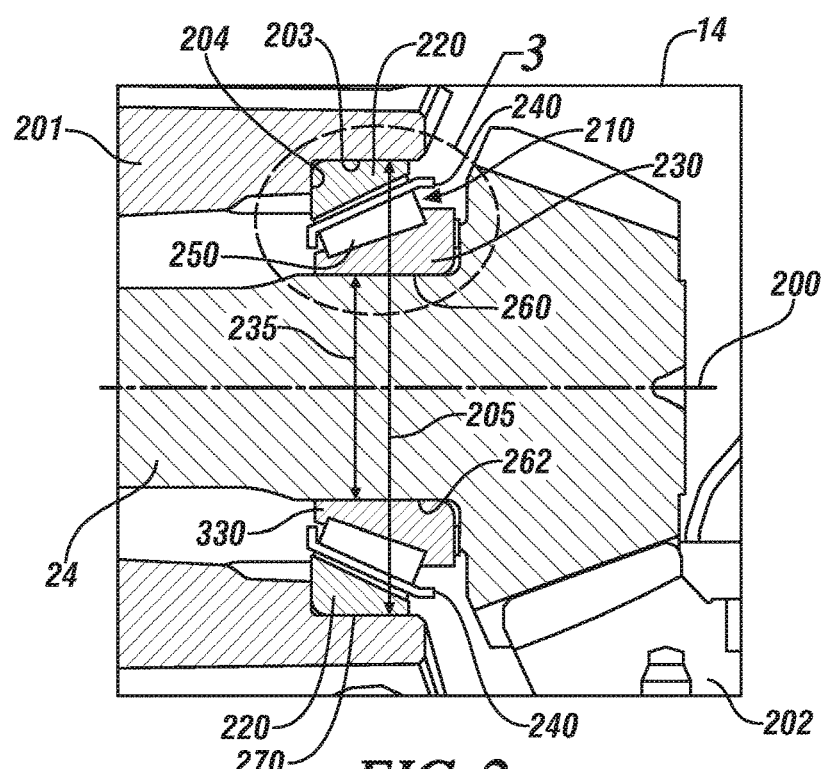
FIG. 2 is a side schematic view of a housing and a rotating shaft supported therein by a bearing assembly in accordance with embodiments.
Figure 3:
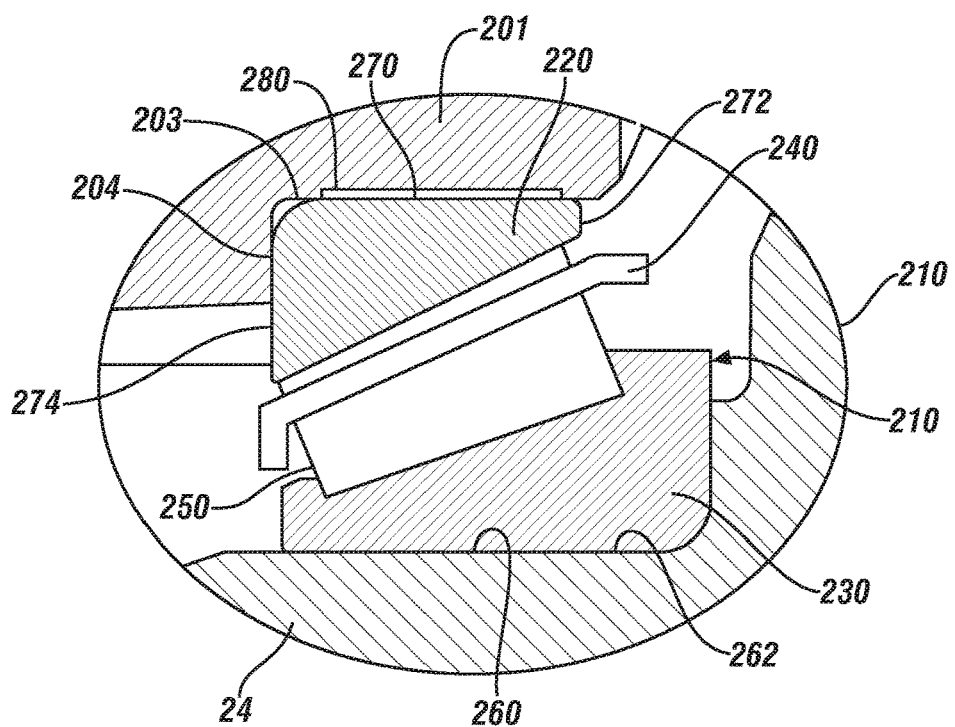
FIG. 3 is an enlarged side schematic view of the bearing assembly of FIG. 2.
Figure 4:
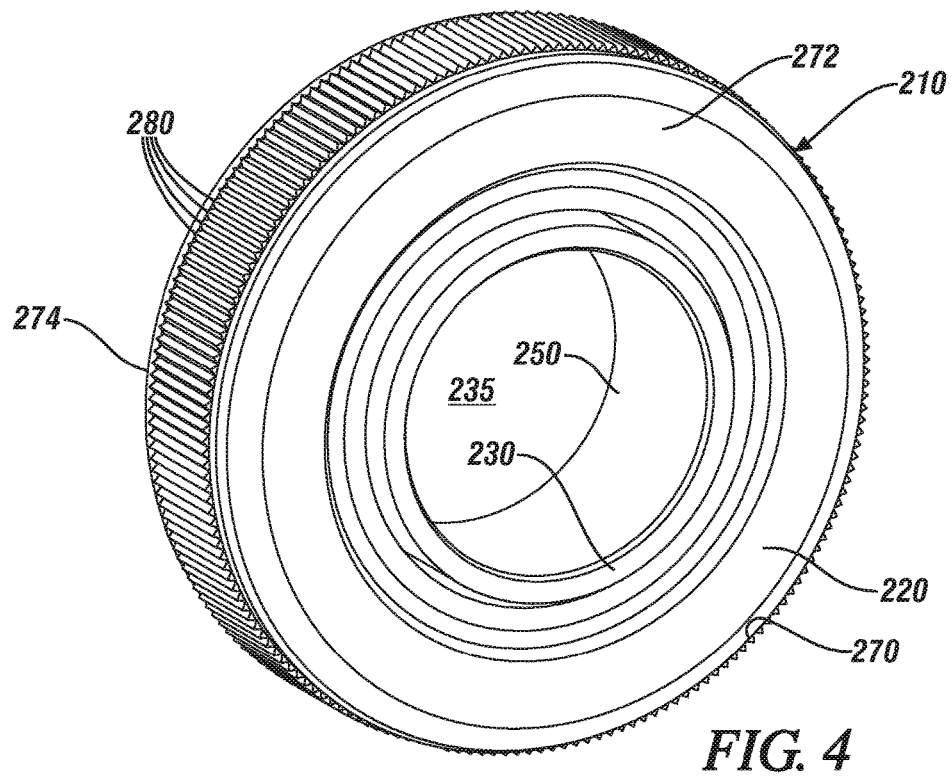
FIG. 4 is a perspective view of the bearing assembly of FIGS. 2 and 3 in accordance with embodiments.

With reference to FIGS. 2-4, the rotatable prop-shaft 24 may extend through a housing 201 of the RDM 14, which is fixed relative to the chassis or frame 20, in order to be rotatably coupled with a gear set 202 that is in turn operably coupled with the rear axles 28 of FIG. 1. To this end, the housing 201 includes axial shoulder surfaces 203 and radial shoulder surfaces 204, which define an aperture 205. A bearing assembly 210 serves to support the rotatable prop-shaft 24 within the aperture 205 while permitting rotation of the rotatable prop-shaft 24 about a longitudinal axis 200 thereof.

As shown in FIGS. 2-4, the bearing assembly 210 includes an outer race 220, an inner race 230, a cage 240 and rotating bearing elements 250 which are radially interposed between the outer race 220 and the inner race 230. In embodiments, a plurality of rotating bearing elements 250 are disposed between the outer race 220 and the inner race 230.

In operation, the bearing assembly 210 is operably installed within the aperture 205, which is sized to tightly fit (e.g., interference fit) about the outer race 220 or to be slightly larger than the outer race 220, and the rotatable prop-shaft 24 extends through an aperture 235 (see FIG. 2) which is defined by inner race 230. When the bearing assembly 210 is installed in housing 201, the axial shoulder surfaces 203 interface with exterior facing surface 270 of the outer race 220. Similarly, inner surface 260 of the inner race 230 interfaces with radial surfaces 262 of the rotatable prop-shaft 24 rotatably supporting the rotatable prop-shaft 24 thereon.

The bearing assembly 210 further includes serrations 280 which are provided on the exterior facing surface 270 of the outer race 220. The serrations 280 extend in an axial direction between front and rear faces 272, 274. The serrations 280 protrude radially outwardly from the exterior facing surface 270. Similar serrations may be provided on the inner surface 260 of the inner race 230 to protrude radially inwardly. The following description relates only to the case where the serrations 280 are provided on the exterior facing surface 270. This is done for purposes of clarity and brevity and is not intended to otherwise limit the scope of the application in any way.

At least the serrations 280 and possibly all or sections of the outer race 220 may be formed of materials which are harder than that of the housing 201. In accordance with embodiments, the serrations 280 and all or the sections of the outer race 220 may be formed of steel or another similar material and the housing 201 may be formed of aluminum or another similar material. As such, when the bearing assembly 210 and, more particularly, the outer race 220 is installed in the aperture 205, the outer race 220 is inserted into the aperture 205 such that the exterior facing surface 270 interfaces with the axial shoulder surfaces 203 and the serrations 280 deform the proximal portions of the housing 201 (e.g., an interference fit). Such deformation, as will be described herein, serves to anchor the serrations 280 within the proximal portions of the housing 201 and thus provides for anti-rotation features that prevent a spinning of the bearing assembly 210 relative to the housing 201. Where similar serrations are provided on the inner surface 260 of the inner race 230 and the rotatable prop-shaft 24 is formed of materials that are softer than the serrations, the serrations deform the rotatable prop-shaft 24 and such deformation thus provides for anti-rotation features that prevent a spinning of the bearing assembly 210 relative to the rotatable prop-shaft 24.

Figure 6:
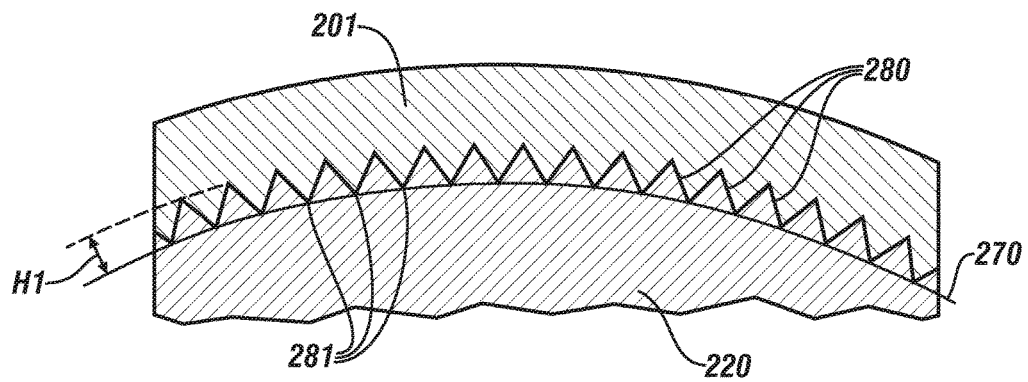
FIG. 6 is an axial view of serrations of a bearing race in accordance with embodiments.
Figure 7:
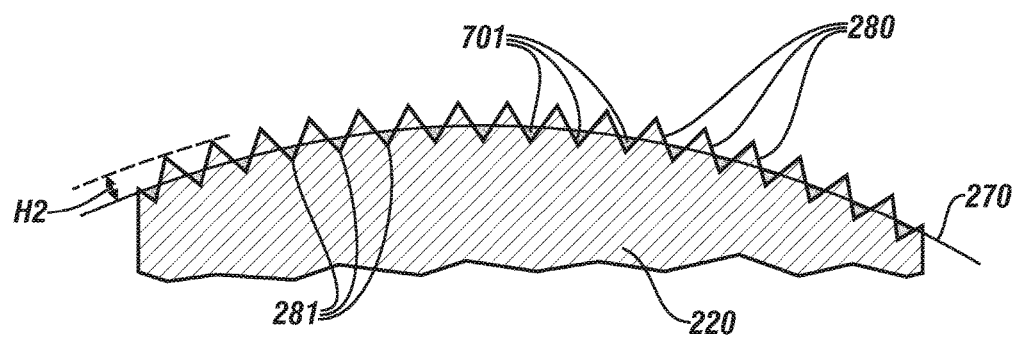
FIG. 7 is an axial view of serrations of a bearing race in accordance with further embodiments.

With reference to FIGS. 6 and 7, each of the serrations 280 extends in a locally defined radially outward direction from the exterior facing surface 270. As such, the serrations 280 deform the material of the housing 201 to a degree which is defined by their respective heights H1 from the exterior facing surface 270. In accordance with embodiments, each of the serrations 280 forms a land 281 with at least one adjacent or neighboring serration 280. Where the lands 281 are coplanar with the exterior facing surface 270, the respective heights H1 of the serrations 280 are the lengths of the serrations 280 from the exterior facing surface 270 (see FIG. 6). Conversely, where the lands 281 are radially displaced from the exterior facing surface 270, the respective heights H2 of the serrations 280 are the lengths of the serrations 280±the radial displacement (see FIG. 7). In accordance with embodiments, where the lands 281 are displaced radially inwardly from the exterior facing surface 270, as shown in FIG. 7, the bottom-most portions of the lands 281 may be filled with an epoxy 701 or another similar material.

Figure 5:
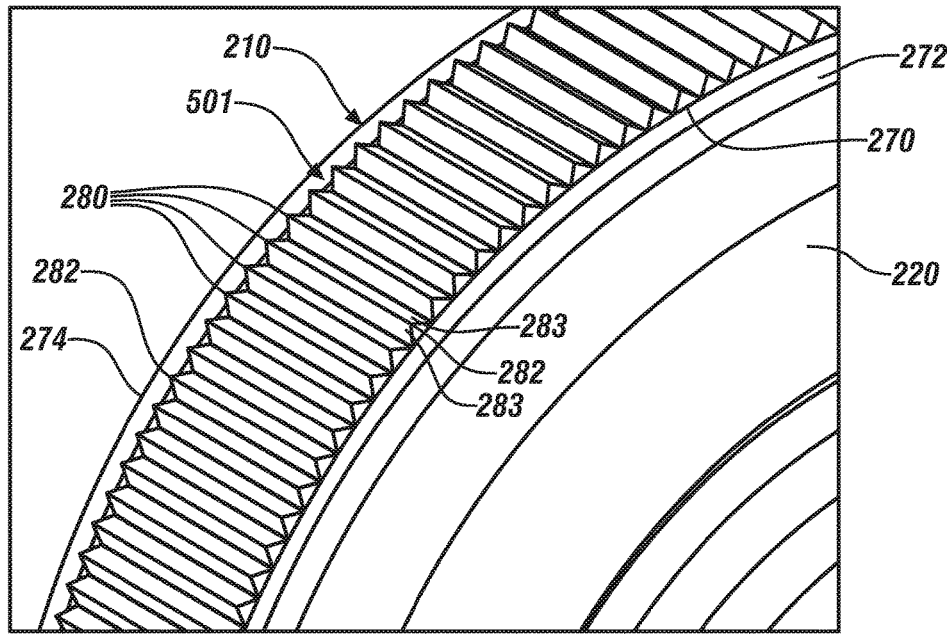
FIG. 5 is an enlarged perspective view of a portion of the bearing assembly of FIG. 4.

In accordance with embodiments and as shown in FIGS. 3-5 in particular, each serration 280 may be disposed to abut in a side-to-side arrangement 501 with at least one neighboring serration 280. Alternatively, with reference to FIG. 8, each serration 280 may be spaced in a side-by-side arrangement 801 from at least one neighboring serration 280.

Figure 8:
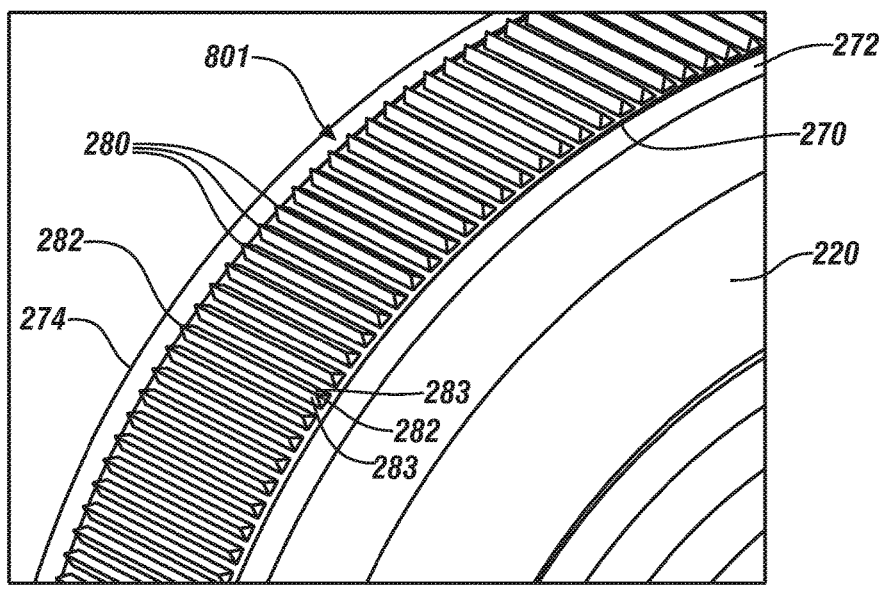
FIG. 8 is a perspective view of the bearing assembly of FIGS. 2 and 3 in accordance with alternative embodiments.

In any case, as shown in FIGS. 5 and 8, each serration 280 includes opposite axial ends 282 and lateral surfaces 283. The opposite axial ends 282 are respectively associated with the front and rear faces 272, 274 of the outer race 220. The lateral surfaces 283 extend between the opposite axial ends 282 and taper toward one another with increasing radial distance from the exterior facing surface 270. In accordance with embodiments, the opposite axial ends 282 may taper towards one another (see FIGS. 5 and 8) with increasing radial distance from the exterior facing surface 270. Such tapering, especially at the lead end as defined during the insertion of the outer race 220 into the aperture 205, may facilitate insertion.

Figure 9:
FIG. 9 is a radial view of an end of a serration of a bearing race in accordance with embodiments.
Figure 10:
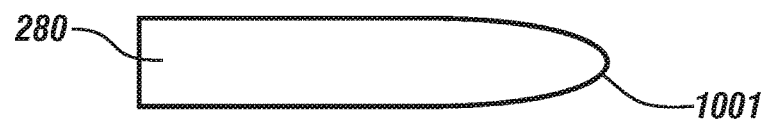
FIG. 10 is a radial view of an end of a serration of a bearing race in accordance with embodiments.
Figure 11:
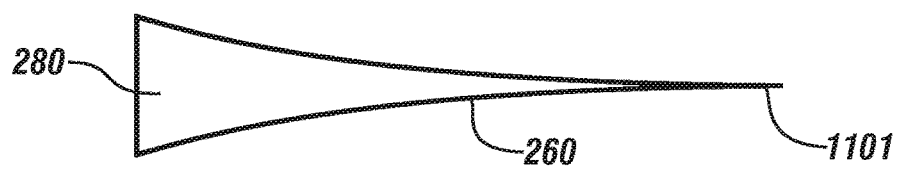
FIG. 11 is a radial view of an end of a serration of a bearing race in accordance with embodiments.

In accordance with further embodiments and with reference to the radial views of an individual serration 280 in each of FIGS. 9-11, at least one of the opposite axial ends 282 (e.g., the lead end) may include a taper. For example, as shown in FIG. 9, the taper may be defined in the circumferential direction and may be provided as a straight taper 901 where the opposite sides of the opposite axial end 282 extend toward one another in straight lines. As another example, as shown in FIG. 10, the taper may be defined in the circumferential direction and may be provided as a convex taper 1001 where the opposite sides of the opposite axial end 282 extend toward one another in curved lines that form a convex shape. As yet another example, as shown in FIG. 11, the taper may be defined in the circumferential direction and may be provided as a concave taper 1101 where the opposite sides of the opposite axial end 282 extend toward one another in curved lines that form convex shape.

Figure 12:
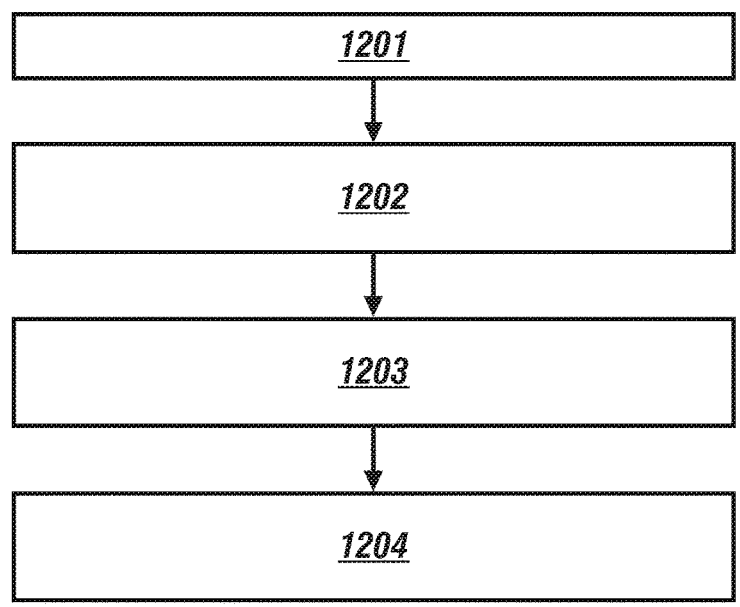
FIG. 12 is a flow diagram illustrating a bearing assembly insertion method in accordance with embodiments.

With reference to FIG. 12, a bearing assembly insertion method is provided for use with the housing 201 and the bearing assembly 210 described above. The method includes forming the outer race 220 (block 1201), and providing the exterior facing surface 270 with the serrations 280 (block 1202). In the provisioning of the serrations 280, the method may also include forming the serrations 280 so as to limit stress concentrations in the housing 201 (block 1203). In addition, the method may include inserting the outer race 220 into the aperture 205 of the housing 201 sized to tightly fit about the exterior facing surface 270 such that the serrations 280 deform proximal portions of the housing 201 during the insertion (block 1204). In accordance with embodiments, and as noted above, at least the serrations 280 may include a harder material than that of the housing 201.

As to the forming of the serrations 280 so as to limit stress concentrations in the housing 201, the serrations 280 in the side-to-side arrangement 501 of FIG. 5 or the side-by-side arrangement 801 of FIG. 8 may be formed with rounded and continuous edges and corners as well as rounded and continuous land edges and corners in the lands 281 as opposed to the angular formations illustrated in FIGS. 6 and 7. As such, once the serrations 280 deform the proximal portions of the housing 201, the proximal portions of the housing 201 will similarly have rounded edges and corners which complement those of the serrations 280 and the lands 281.

In accordance with additional embodiments, any material of the housing 201 which is undesirably displaced by the deformation can be machined or otherwise removed. Alternatively, the outer face 220 can be formed such that the exterior facing surface 270 is slightly recessed in a radial dimension from the axial shoulder surfaces 203. As such, during the deformation of the material of the housing 201, the material which is displaced by the serrations 280 can fill in the annular space between the housing 201 and the exterior facing surface 270 and may not require additional machining or material removal.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A race of a bearing assembly, the race comprising:
   an exterior facing surface having front and rear faces; and
   serrations extending in an axial direction between the front and rear faces and protruding outwardly from the exterior facing surface wherein:
   each serration comprises opposite axial ends and lateral surfaces which extend between the opposite axial ends and taper toward one another with increasing radial distance from the exterior facing surface, and
   at least one of the opposite axial ends comprises a taper that tapers toward the other axial end.

2. The race according to claim 1, wherein at least the serrations comprise steel.

3. The race according to claim 1, wherein the serrations protrude radially outwardly from the exterior facing surface.

4. The race according to claim 1, wherein lands coplanar with the exterior facing surface are defined between neighboring serrations.

5. The race according to claim 1, wherein lands radially displaced from the exterior facing surface are defined between neighboring serrations.

6. The race according to claim 1, wherein each serration abuts in a side-to-side arrangement with at least one neighboring serration.

7. The race according to claim 1, wherein each serration is separate from at least one neighboring serration.

8. An anti-rotation bearing assembly mounting, comprising:
   a housing defining an aperture;
   a rotating feature extending through the aperture; and
   a bearing assembly disposed to support the rotating feature in the aperture during rotation thereof, the bearing assembly comprising outer and inner races which interface with the housing and the rotating feature, respectively,
   at least an exterior facing surface of the outer race comprising serrations configured to deform a material of the housing during an insertion into the aperture of the housing, wherein:
   each serration comprises opposite axial ends and lateral surfaces which extend between the opposite axial ends and taper toward one another with increasing radial distance from the exterior facing surface, and
   at least one of the opposite axial ends comprises a taper that tapers toward the other axial end.

9. The anti-rotation bearing assembly mounting according to claim 8, wherein the housing comprises a chassis of a vehicle and the rotating feature comprises a rotatable shaft.

10. The anti-rotation bearing assembly mounting according to claim 8, wherein the bearing assembly further comprises a rotating bearing element secured between the outer and inner races.

11. The anti-rotation bearing assembly mounting according to claim 10, wherein the outer race comprises a material which is harder than that of the housing.

12. The anti-rotation bearing assembly mounting according to claim 8, wherein each serration abuts in a side-to-side arrangement with at least one neighboring serration.

13. The anti-rotation bearing assembly mounting according to claim 8, wherein each serration is separate from at least one neighboring serration.

14. A bearing insertion method, comprising:
   forming a bearing assembly race with an exterior facing surface;

providing the exterior facing surface with serrations extending in an axial direction and protruding radially outwardly from the exterior facing surface;

tapering a leading end of each of the serrations toward a trailing end of each serration; and inserting the bearing assembly race into an aperture of a housing with the leading end of each of the serrations leading such that the serrations deform the housing during the insertion.

15. The bearing insertion method according to claim 14, wherein at least the serrations comprise a harder material than that of the housing.

* * * * *